Figure 1:
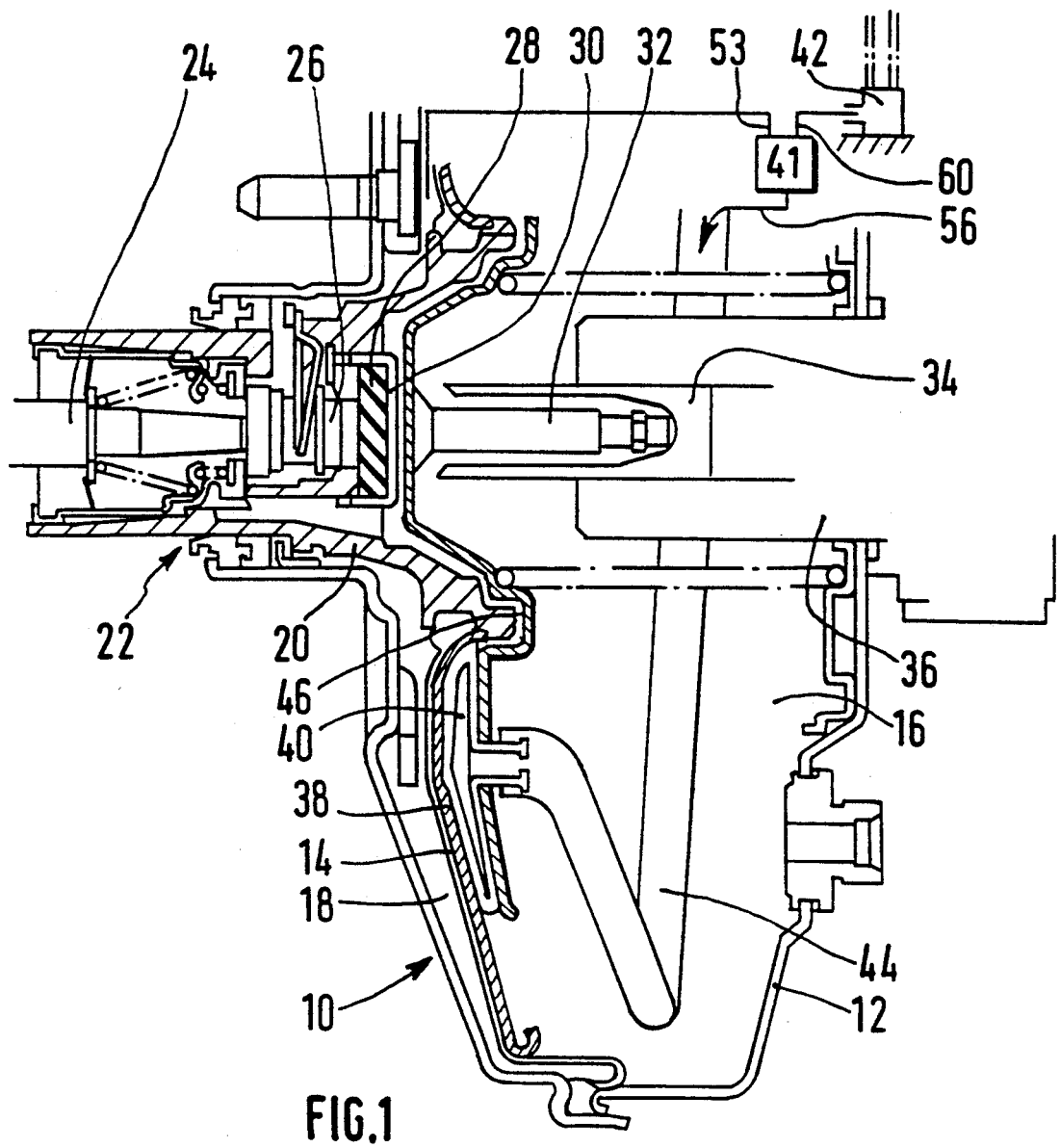

United States Patent [19]
Castel

[11] Patent Number: 5,275,265
[45] Date of Patent: Jan. 4, 1994

[54] BRAKE-BOOSTER WITH MODULATED REACTION

[75] Inventor: Philippe Castel, Paris, France

[73] Assignee: Bendix Europe Services Techniques, Drancy, France

[21] Appl. No.: 934,055

[22] Filed: Aug. 21, 1992

[30] Foreign Application Priority Data

Sep. 30, 1991 [FR] France .................. 91 11982

[51] Int. Cl.⁵ .................. B60T 8/30; B60T 13/52
[52] U.S. Cl. .................. 188/356; 91/369.1; 91/376 R; 188/195; 303/22.1; 303/50
[58] Field of Search .......... 303/114.3, 100, 22.1, 303/22.5, 22.8, 9.66, 9.69, 50–56, 188/357, 356, 188/195; 91/369.1, 376; 60/547.1

[56] References Cited

U.S. PATENT DOCUMENTS

| | | | |
|---|---|---|---|
| 2,498,438 | 2/1950 | Du Rostu | 188/195 |
| 3,101,110 | 8/1963 | Wettstein | 303/22 |
| 3,150,899 | 9/1964 | Berg et al. | 303/22 |
| 3,211,500 | 10/1965 | Lawson | 303/22 |
| 3,365,245 | 1/1968 | Baibaud | 303/22 |
| 3,411,834 | 11/1968 | Baibaud | 303/7 |
| 3,702,207 | 11/1972 | Armstrong | 303/22 |
| 3,941,430 | 3/1976 | Kubath et al. | 303/22 R |
| 4,198,101 | 4/1980 | Oberthür | 303/22 R |
| 4,304,441 | 12/1981 | Fauck et al. | 303/22 A |
| 4,493,243 | 1/1985 | Horibe | 91/369 B |
| 4,630,706 | 12/1986 | Takayama et al. | 303/22.8 X |
| 4,744,608 | 5/1988 | Pressaco | 303/22.5 |
| 5,133,592 | 7/1992 | Wagner et al. | 303/114.3 X |
| 5,172,964 | 12/1992 | Levrai et al. | 303/114.3 X |
| 5,176,065 | 1/1993 | Castel et al. | 188/357 X |
| 5,176,433 | 1/1993 | Byrnes et al. | 303/114.3 X |
| 5,190,125 | 3/1993 | Suzuki et al. | 188/357 |

FOREIGN PATENT DOCUMENTS

| | | |
|---|---|---|
| 0151028 | 8/1985 | European Pat. Off. |
| 1530832 | 4/1969 | Fed. Rep. of Germany |
| 2422676 | 11/1975 | Fed. Rep. of Germany |
| 2622534 | 12/1977 | Fed. Rep. of Germany |
| 3910283 | 10/1990 | Fed. Rep. of Germany |
| 3939499 | 6/1991 | Fed. Rep. of Germany |
| 1340687 | 9/1963 | France |
| 58-170656 | 10/1983 | Japan |
| 59-089258 | 5/1984 | Japan |
| 60-166553 | 8/1985 | Japan |
| 0600762 | 4/1948 | United Kingdom |

Primary Examiner—Douglas C. Butler
Attorney, Agent, or Firm—Larry J. Palguta; Ken C. Decker

[57] ABSTRACT

The invention relates to a brake-booster (10) of a vehicle, comprising a casing (12) and a diaphragm (14) which divides in a sealed manner the interior of the casing into a front chamber (16) and a back chamber (18), a hollow piston (20) movable in the casing receiving an input member (24) adapted to be connected to a brake pedal, an output assembly comprising a lid (30) and an output rod (32) adapted to be connected to a piston (34) of a master cylinder (36), a reaction disk (28) in a deformable material arranged between the hollow piston (20) and the lid (30) so as to receive an image of the output force of the booster (10) when it is put into operation in order to cause a deformation of the reaction disk (28) tending to push back the input member (24) as a function of the image. According to the invention, a sealed fluid bearing (40) connected to a valve, which is connected to a fluid sensor (42) of the load of the vehicle, is interposed between the output rod (32) and the lid (30), the bearing (40) resting on the hollow piston (20) so as to modulate the image as a function of the load of the vehicle.

9 Claims, 2 Drawing Sheets

BRAKE-BOOSTER WITH MODULATED REACTION

The present invention relates to boosters of the partial vacuum type used on board motor vehicles so as to provide an aid to their braking.

It is known that a brake-booster of a vehicle comprises a casing and a diaphragm which divides in a sealed manner the interior of the casing into a front chamber and a back chamber, a hollow piston movable in the casing receiving an input member adapted to be connected to a brake pedal, an output assembly comprising a lid and an output rod adapted to be connected to a piston of a master cylinder, a reaction disk in a deformable material arranged between the hollow piston and the lid so as to receive an image of the output force of the booster when it is put into operation in order to cause a deformation of the reaction disk tending to push back the input member as a function of the image of the output force.

Such boosters are well known in the Art and it is pointless to explain their operation here.

Documents FR-A-2,592,620 and EP-A-0,341,101, among many others, describe improvements made particularly in the field of control of the reaction felt on the input member during braking.

In particular, in EP-A-0,341,101, the problem solved is that of a progressive sensation on the pedal when passing from the boosted phase to the non-boosted phase during heavy braking. To this end, the output assembly is constructed in two parts movable with respect to one another so as to act upon different surfaces of the reaction disk.

Other situations exist in which it is favorable to modify the sensitivity on the pedal for a given pressure in the braking system. Conversely, it is useful for the same sensation on the pedal to correspond to a greater braking intensity for a loaded vehicle than for an empty vehicle for the same deceleration required by the driver.

The precise object of the present invention is a booster enabling the reaction felt by the driver to be modulated as a function of the load of the vehicle.

In order to do this, a sealed fluid bearing, the internal pressure of which is a function of the load of the vehicle, is interposed between the output rod and the lid of the output assembly, this bearing resting on the hollow piston so as to modulate the image of the output force as a function of the load of the vehicle.

Preferably, the output rod is rigidly attached to a cup extending into the front chamber, the above-mentioned bearing being arranged between this cup and the hollow piston.

Also preferably, the internal pressure in the bearing is additionally a function of the pressure prevailing in the back chamber of the booster.

Figure 2:
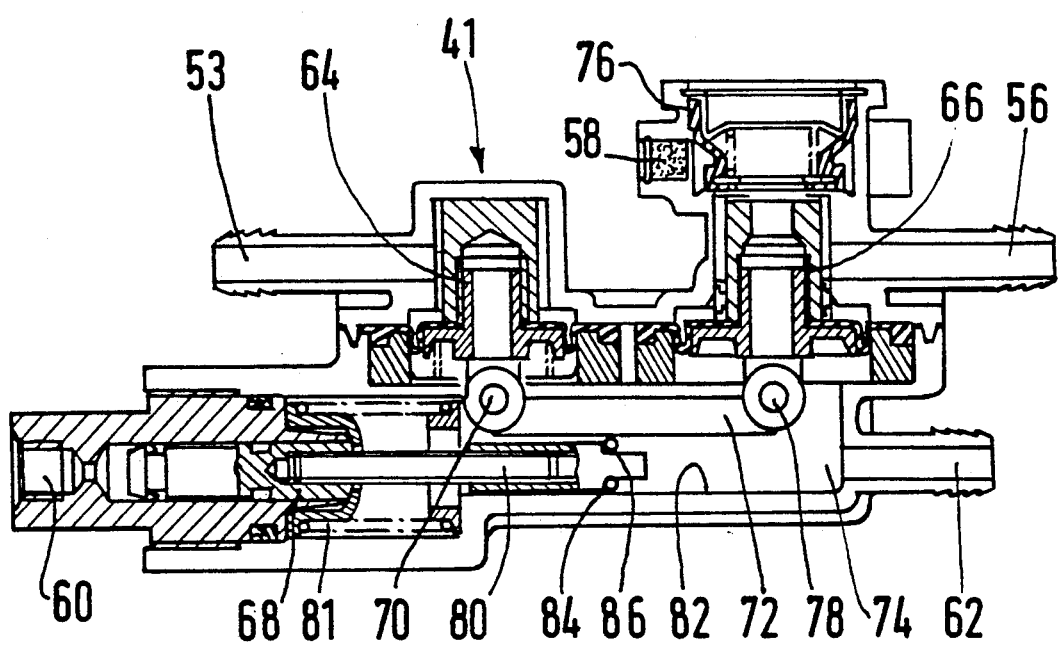

The invention will now be described by way of non-limiting example with reference to the accompanying drawings in which:

FIG. 1 shows a diagrammatic partial sectional view of a booster according to the present invention, and FIG. 2 shows diagrammatically an embodiment of a valve means controlling the pressure in the bearing.

With reference now to FIG. 1, the booster 10 is constituted by a casing 12 internally divided in a sealed manner by a diaphragm 14 into two chambers termed respectively front chamber 16 and back chamber 18. A hollow piston 20 carries on the one hand a peripheral edge of the diaphragm 14 and on the other hand valve means 22, controlled by an input member 24 connected to a brake pedal (not shown).

In conventional manner, the input member 24 presses against a plunger 26 arranged facing a reaction disk 28 enclosed between the hollow piston 20 and a lid 30 of the output assembly. This output assembly further comprises an output rod 32 capable of actuating the piston 34 of a master cylinder 36 which is shown very diagrammatically.

The output rod 32 is rigidly attached to a cup 46 extending into the front chamber 16 facing the hollow piston 20 here extended circumferentially by a disk 38.

A fluid bearing 40 is interposed between the cup 46 and the hollow piston 20 (or the disk 38).

This fluid bearing 40 is sealed and receives the load information via a fluid sensor 42 of the load of the vehicle.

This fluid sensor 42 of the load is shown symbolically in FIG. 1 as it does not per se form part of this invention. It may, for example, be favorably constituted by the sensor described in FR-A-2,649,046 which discloses a sensor in the form of a sealed chamber arranged between a suspension spring and a base.

As mentioned above, it is preferable for the pressure in the bearing 40 also to be a function of the pressure prevailing in the back chamber 18 of the booster.

To this end, the bearing 40 is connected by a sealed conduit 44 to a valve means 41 shown in greater detail in FIG. 2.

This valve means comprises several pipes the pipe 53 is connected to the back chamber 18 of the booster; the pipe 56 is connected to the pipe 44; the pipe 62 is connected to the source of partial vacuum, for example that to which the front chamber 16 is connected; and the pipe 60 is connected to the fluid sensor 42.

The valve means shown comprises three pistons 64, 66, 68 arranged so as to slide in sealed manner.

One face of the piston 64 receives the pressure prevailing in the back chamber 18 via the pipe 53.

The other face of this piston 64 is rotatably mounted by a pin 70 at the end of an arm 72 in a chamber 74 connected to the source of partial vacuum by the pipe 62.

The piston 66 has a face capable of operating a shutter valve 76 opening or closing a communication between an inlet for air at atmospheric pressure 58 and the pipe 56. The other face of this piston 66 is rotatably mounted at the other end of the arm 72 by a pin 78.

The piston 68 receives on one of its faces via the pipe 60 a pressure which is a function of the load of the vehicle and coming from the fluid sensor 42. Its other face comprises an extension forming a push rod 80. The piston 68 is returned to the rest position by means of a prestressed spring 81.

The end of the push rod 80 opposite the piston 68 is provided with an element bearing on the one hand against a fixed surface 82 of the chamber 74 and on the other hand against the arm 72 between its two end pins 70, 78. This element is favorably constituted by two rollers 84, 86 thus avoiding the generation of excessive friction forces and determining on the arm 72 a variable point of support so that the arm 72 constitutes a lever.

It will be understood that with this arrangement, the piston 68 assumes a position which is a function of the load of the vehicle, which position determines that of the point of support of the roller 86 against the arm 72.

Thus when braking is initiated by the actuating rod 24, the pressure in the back chamber 18 moves the piston 64. The movement of the latter is transmitted to the piston 66 with a multiplying factor which is a function of the precise position of the roller 86 against the arm 72, that is to say, of the load of the vehicle.

Thus when the vehicle is empty, the piston 68 is stopped toward the left of FIG. 2, the roller 86 is also in its extreme position toward the left, and this prevents the transmission of the force from the piston 64 to the piston 66, and, consequently, prevents the opening of the valve shutter 76 and the filling of the bearing 40. During braking, the reaction disk 28 then receives the output force in its entirety.

When the vehicle is loaded, during braking, the bearing 40 has an internal pressure which is a function of the load. The output rod 32 then transmits only a part of the output force to the reaction disk 28, which part will therefore be a function of the pressure in the bearing 40, and therefore of the load of the vehicle.

This driver will thus perceive substantially no difference in obtaining an identical deceleration with a loaded vehicle as with an unloaded vehicle, even though the pressures involved will be quite distinctly different.

The person skilled in the art will be able to make many modifications to the present invention without going beyond the scope of the invention. For example, in the example shown, the bearing 40 assumes an annular shape and is arranged between the cup 46 and the extension 38 of the hollow piston 20.

The bearing could just as well have assumed another shape and have been arranged differently. In fact, its function being to relieve the strain on the reaction disk, it is sufficient for it to bear directly or indirectly against the hollow piston 20.

I claim:

1. A brake-booster of a vehicle, comprising a casing and a diaphragm which divides in sealed manner an interior of the casing into a front chamber and a back chamber, a hollow piston movable in said casing and receiving an input member adapted to be connected to a brake pedal, an output assembly comprising a lid and an output rod adapted to be connected to a piston of a master cylinder, a deformable material reaction disk arranged between said hollow piston and lid to receive an image of the output force of the booster when the booster is operated in order to cause a deformation of the reaction disk tending to push back the input member as a function of said image, characterized in that a sealed fluid bearing, an internal pressure of which is a function of vehicle load, is interposed between said output rod and said lid, said bearing engaging said hollow piston so as to modulate said image as a function of the vehicle load.

2. The booster according to claim 1, characterized in that the internal pressure in said bearing is also a function of pressure prevailing in said back chamber.

3. The booster according to claim 1, characterized in that said output rod is attached rigidly to a cup extending into the front chamber, said bearing located between said cup and one of said hollow piston and of an extension of the hollow piston.

4. The booster according to claim 3, characterized in that the bearing assumes a substantially annular shape.

5. The booster according to claim 4, characterized in that said bearing is connected via valve means to a source of fluid under pressure.

6. The booster according to claim 5, characterized in that said valve means comprises a first piston onto one face of which is applied pressure prevailing in said back chamber and the other face of which is rotatably mounted at one end of an arm, a second piston one face of which controls a valve capable of connecting said bearing to said source of fluid and the other face of the second piston rotatably mounted at the other end of said arm, and a push rod the position of which is a function of said vehicle load which determines a variable point of support for said arm so that the arm forms a lever.

7. The booster according to claim 6, characterized in that one end of said push rod is provided with element means bearing on a fixed surface and on the arm between the ends of said arm.

8. The booster according to claim 7, characterized in that said element is constituted by at least one roller.

9. The booster according to claim 6, characterized in that said push rod is constituted by an extension at one end of a third piston at the other end of which is applied a force generated by said fluid sensor of the vehicle load, said third piston being returned to the rest position by resilient means of the spring type.

* * * * *